O. P. OSTERGREN & C. O. L. CARDELL.
ROTARY BLOWER OR COMPRESSOR.
APPLICATION FILED APR. 11, 1906.
902,441.
Patented Oct. 27, 1908.
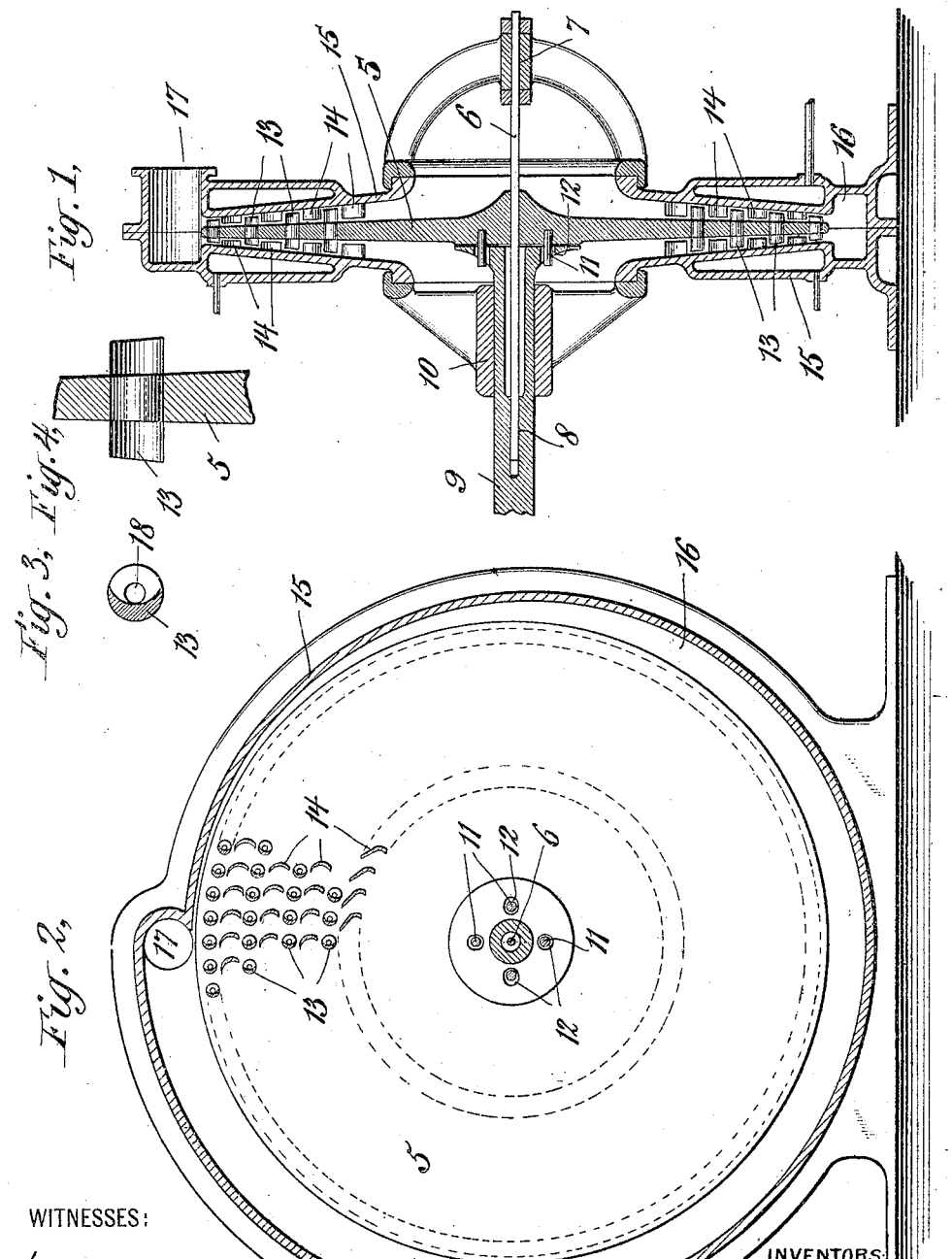

UNITED STATES PATENT OFFICE.

OSCAR P. OSTERGREN, OF NEW YORK, AND CHARLES O. L. CARDELL, OF PEARL RIVER, NEW YORK.

ROTARY BLOWER OR COMPRESSOR.

No. 902,441.

Specification of Letters Patent.

Patented Oct. 27, 1908.

Application filed April 11, 1906. Serial No. 311,051.

To whom it may concern:

Be it known that we, OSCAR P. OSTERGREN, a subject of the Crown of Sweden, and resident of the borough of Manhattan, of the city of New York, county and State of New York, and CHARLES O. L. CARDELL, a citizen of the United States of America, and resident of Pearl River, county of Rockland, and State of New York, have invented certain new and useful Improvements in Rotary Blowers or Compressors, of which the following is a specification, reference being had to the accompanying drawings, forming a part thereof.

Our invention relates to rotary blowers or compressors of the type designed to operate at extremely high speeds.

The main object of our invention is to so construct and arrange the impelling wheel that it shall be permitted, within certain limits, to select its own path of movement of rotation. To this end we supply means, such as a light flexible shaft, for supporting the wheel, such as will permit relative movements of the wheel transverse the plane of rotation, and provide a driving means therefor which, while positively connected therewith in driving relation, will also permit such relative transverse movements.

We also provide the wheel with blades or vanes upon opposite sides thereof so as to balance the pressure longitudinally of the axis of rotation in opposite directions, and with balancing orifices through the wheel contiguous the blades, and our invention further consists in certain details of construction and combination of parts as will be hereinafter more fully pointed out.

In order that our invention may be fully understood, we will now proceed to describe an embodiment thereof with reference to the accompanying drawings illustrating same, and will then point out the novel features in claims.

In the drawings: Figure 1 is a view in central vertical section through a blower longitudinally of the plane of rotation of the impelling wheel. Fig. 2 is a view in vertical section thereof at right angles to the plane of section of Fig. 1. Figs. 3 and 4 are detail views of a blade or vane employed, showing in Fig. 4 the construction whereby the same may be adjusted relatively to the wheel carrying it.

Referring to the drawings by reference characters, 5 designates the impelling wheel, which is supported by means of a small flexible shaft 6. This shaft 6 is journaled at one end in a stationary bearing 7, and at the other end in a hollowed out portion 8 of a driving shaft 9. The driving shaft 9 is journaled in a stationary bearing 10 upon the opposite side of the impelling wheel 5 to which the bearing 7 is located, and the said shaft 9 is connected to the impelling wheel 5 in such a manner as to impart positive driving movements thereto by means of pins 11 and slots 12. This pin and slot connection constitutes a universal joint which, while enforcing positive driving connections, permits relative movements of the wheel 5 transverse of the axis of rotation thereof. The shaft 6 being an exceedingly light and flexible shaft, will further permit such movements within certain limits, the said shaft springing and bowing to permit such movements. The shaft 9 may be conveniently connected with some very high speed motor, such, for instance, as a turbine engine, whereby an exceedingly high velocity of movement will be imparted to the impelling wheel 5. The result will be that the wheel 5 will be permitted to slightly vary its position from the position occupied when normally at rest, so that it shall select its own path of rotation. In this way the machine will be relieved of great strains, and a higher speed of rotation will be possible before the danger limit is reached than would be possible if the said wheel 5 were rigidly connected with the relatively heavy shaft 9.

The impelling wheel 5 is provided with blades or vanes 13 upon opposite sides thereof. These blades or vanes are arranged in concentric series upon opposite sides, and are alternated with corresponding series of stationary blades or vanes projecting inwardly from the casing 15 upon opposite sides of said impelling wheel. In cross section the chamber inclosed by the casing walls 15 converges radially in a direction away from the axis of the machine, and similarly the length to which the blades or vanes 13, 14 project from the parts carrying them lessens progressively in the same direction.

The blades or vanes 13 upon opposite sides of the impelling wheel are preferably made, each pair, out of a single piece of metal fitted with a drive fit to said wheel. By this arrangement the blades may be slightly adjusted with respect to the wheel when the device is first set up, as will be well understood. Communication is provided between opposite sides of the impelling wheel by means of openings 18 (contiguous each pair of blades or vanes upon the wheel,) the orifices 16 being conveniently made through the piece of metal out of which the said pair of blades or vanes are formed. These orifices act as balancing orifices, so as to help preserve a balance of pressure between the opposite sides of the wheel whereby to militate against any end thrust.

In operation air is taken in at the center of the impelling wheel, and passes through the blades or vanes, the pressure of the air being raised during the process, and the said air under the greater pressure will be delivered into a spiral delivery space 16 which vents to a passage 17. The casing 13 may conveniently be jacketed, as at 17, the said jacket arranged to receive a cooling medium, by which the heat generated in the device may be conveyed away, as will be well understood.

It will be apparent from the foregoing that the device may be employed either as a compressor for taking in air at atmospheric pressure and delivering it at a pressure thereabove, or as a so-called vacuum pump for taking in air at a pressure below that of atmosphere and delivering it at atmospheric pressure or at a pressure thereabove.

What we claim is:

1. The combination with a rotatable element and a relatively heavy shaft, of a relatively light flexible shaft supporting the said rotatable element, and a universal joint connection between the heavy shaft and the rotatable element connecting the same together in driving relation but permitting relative movements of the rotatable element transverse of the axis of rotation of the said heavy shaft.

2. The combination with a rotatable element, of a relatively heavy drive shaft therefor, a loose connection between said relatively heavy shaft and said rotatable element permitting relative movements between the two, and a light flexible shaft supporting said rotatable element.

3. The combination with a rotatable element, of a relatively heavy drive shaft therefor, said shaft journaled on one side of said rotatable element and having a loose driving connection with said rotatable element permitting relative movements thereof transverse of the axis of rotation of the said shaft, and a light flexible shaft supporting said rotatable element, said flexible shaft having a bearing on one side in said heavy shaft, and journaled in a stationary bearing upon the other side of said rotatable element.

4. The combination with a driving and a driven member comprising a relatively heavy shaft and a rotatable element, of a plurality of pins upon one of the said members and a plurality of slots in which the said pins are freely received, in the other said member, and a light flexible shaft supporting the said rotatable element.

5. An impelling wheel having a series of transverse openings therethrough and provided with a corresponding series of members each comprising a central supporting portion fitted to a said opening and blades projecting in opposite directions from said central portion.

6. An impelling wheel provided with blades upon opposite sides thereof, and having balancing openings therethrough contiguous the said blades.

7. The combination with a stationary casing having inwardly projecting blades, of an impelling wheel arranged within the casing having oppositely arranged outwardly extending blades alternating with the said stationary blades, said impelling wheel having balancing openings therethrough contiguous the blades, substantially as set forth.

8. An impelling wheel having a series of cylindrical transverse openings therethrough and provided with a corresponding series of members each comprising a cylindrical shank fitted to a said opening, and blades formed as integral portions thereof projecting in opposite directions from said shank portion, said shank portion having an orifice therethrough.

OSCAR P. OSTERGREN.
CHARLES O. L. CARDELL.

Witnesses as to Oscar P. Ostergren:
   D. HOWARD HAYWOOD,
   C. F. CARRINGTON.

Witnesses as to Charles O. L. Cardell:
   O. C. HAMMOND,
   IRVEN H. DEXTER.